(12) United States Patent
Shim

(10) Patent No.: US 12,051,791 B2
(45) Date of Patent: Jul. 30, 2024

(54) BATTERY MODULE

(71) Applicant: LG Chem, Ltd., Seoul (KR)

(72) Inventor: Hyunseok Shim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 617 days.

(21) Appl. No.: 17/048,830

(22) PCT Filed: Aug. 22, 2019

(86) PCT No.: PCT/KR2019/010706
§ 371 (c)(1),
(2) Date: Oct. 19, 2020

(87) PCT Pub. No.: WO2020/060048
PCT Pub. Date: Mar. 26, 2020

(65) Prior Publication Data
US 2021/0151821 A1 May 20, 2021

(30) Foreign Application Priority Data
Sep. 18, 2018 (KR) .................. 10-2018-0111656

(51) Int. Cl.
*H01M 10/6568* (2014.01)
*H01M 10/613* (2014.01)
(Continued)

(52) U.S. Cl.
CPC ..... *H01M 10/6568* (2015.04); *H01M 10/613* (2015.04); *H01M 10/6551* (2015.04);
(Continued)

(58) Field of Classification Search
CPC ............. H01M 10/613; H01M 10/625; H01M 10/647; H01M 10/6551; H01M 10/6552;
(Continued)

(56) References Cited

U.S. PATENT DOCUMENTS

| 4,574,112 A | 3/1986 | Breault et al. |
| 2009/0023056 A1 | 1/2009 | Adams et al. |

(Continued)

FOREIGN PATENT DOCUMENTS

| CN | 105428750 A | 3/2016 |
| CN | 210350040 U | 4/2020 |

(Continued)

OTHER PUBLICATIONS

JP2013048083 machine translation (Year: 2013).*
(Continued)

*Primary Examiner* — Lingwen R Zeng
(74) *Attorney, Agent, or Firm* — Lerner David LLP

(57) ABSTRACT

A battery module, according to an embodiment of the present disclosure includes a battery cell laminate having a plurality of battery cells stacked along a stacking direction, cooling fins interposed between the battery cells, and first and second cooling manifolds connected to the cooling fins. The cooling fins include a first cooling fin having a first inlet and a first outlet and a second cooling fin having a second inlet and a second outlet, where the first inlet and the second outlet are connected to the first cooling manifold, and the second inlet and the first outlet are connected to the second cooling manifold.

13 Claims, 10 Drawing Sheets

(51) Int. Cl.
| | |
|---|---|
| *H01M 10/6551* | (2014.01) |
| *H01M 10/6552* | (2014.01) |
| *H01M 10/6555* | (2014.01) |
| *H01M 10/6557* | (2014.01) |
| *H01M 10/625* | (2014.01) |
| *H01M 10/647* | (2014.01) |
| *H01M 10/6567* | (2014.01) |

(52) U.S. Cl.
CPC ... *H01M 10/6552* (2015.04); *H01M 10/6555* (2015.04); *H01M 10/6557* (2015.04); *H01M 10/625* (2015.04); *H01M 10/647* (2015.04); *H01M 10/6567* (2015.04); *H01M 2220/20* (2013.01); *Y02E 60/10* (2013.01)

(58) Field of Classification Search
CPC ......... H01M 10/6555; H01M 10/6556; H01M 10/6557; H01M 10/6567; H01M 10/6568; H01M 2220/20; Y02E 60/10
See application file for complete search history.

(56) References Cited

U.S. PATENT DOCUMENTS

| | | | |
|---|---|---|---|
| 2011/0262791 A1 | 10/2011 | Im et al. | |
| 2012/0009457 A1* | 1/2012 | Lee | B60L 50/64 |
| | | | 429/120 |
| 2012/0237805 A1* | 9/2012 | Abels | H01M 10/6567 |
| | | | 228/136 |
| 2014/0335390 A1 | 11/2014 | Hwang et al. | |
| 2015/0207187 A1 | 7/2015 | Beltz et al. | |
| 2016/0322680 A1 | 11/2016 | Merriman et al. | |
| 2017/0237130 A1 | 8/2017 | Kim et al. | |
| 2018/0151928 A1 | 5/2018 | Jung et al. | |
| 2021/0151821 A1 | 5/2021 | Shim | |

FOREIGN PATENT DOCUMENTS

| | | | | |
|---|---|---|---|---|
| DE | 10238235 A1 | 3/2004 | | |
| JP | H10106521 A | 4/1998 | | |
| JP | 2007042515 A | 2/2007 | | |
| JP | 2010244802 A | 10/2010 | | |
| JP | 2013045578 A | 3/2013 | | |
| JP | 2013048083 A | * 3/2013 | ......... | H01M 10/625 |
| JP | 2013048083 A | 3/2013 | | |
| KR | 20080109950 A | 12/2008 | | |
| KR | 20130062056 A | 6/2013 | | |
| KR | 20150045245 A | 4/2015 | | |
| KR | 20150128360 A | 11/2015 | | |
| KR | 20160031718 A | 3/2016 | | |
| KR | 101622096 B1 | 5/2016 | | |
| WO | 2010109001 A1 | 9/2010 | | |
| WO | 2013015360 A1 | 1/2013 | | |

OTHER PUBLICATIONS

Search Report dated Jul. 15, 2022 from Office Action for Chinese Application No. 201910874532.0 issued Jul. 27, 2022. 3 pgs.
International Search Report for Application No. PCT/KR2019/010706 mailed Dec. 4, 2019, 2 pages.
Extended European Search Report including Written Opinion for Application No. 19863205.1 dated May 3, 2021, 7 pages.

* cited by examiner

[FIG. 1]
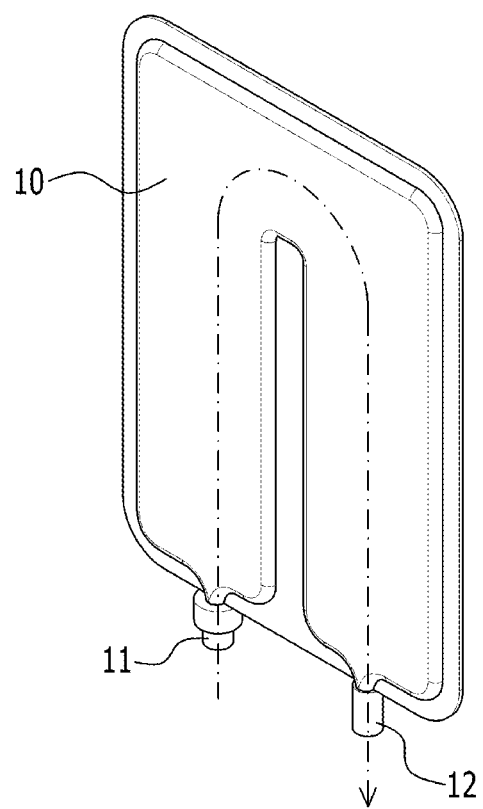

[FIG. 2]
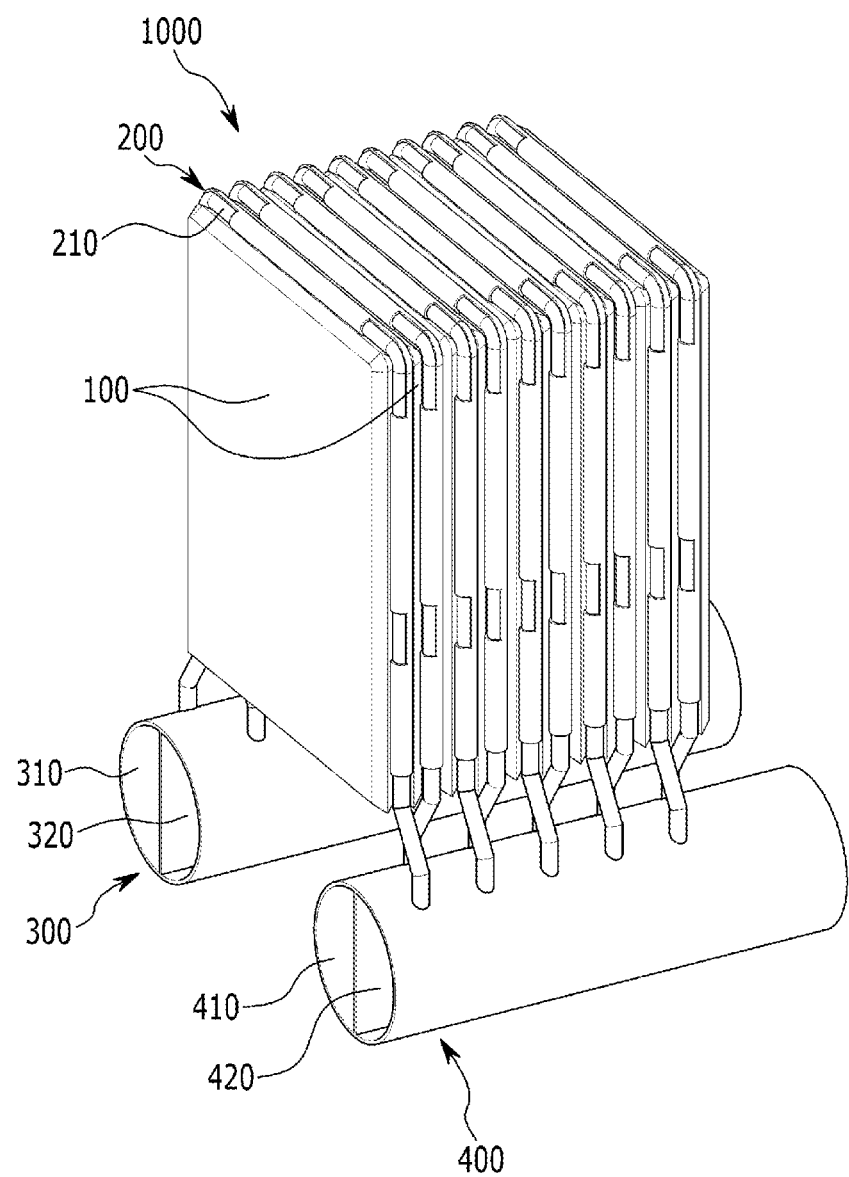

[FIG. 3]
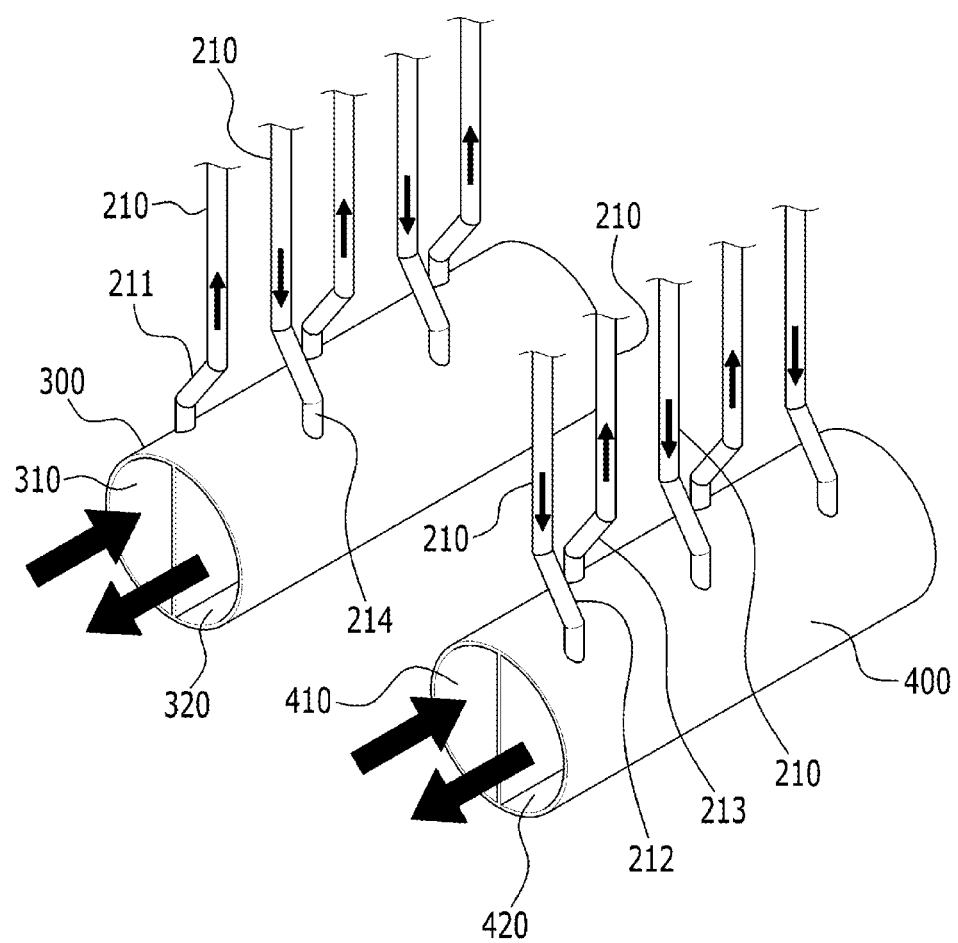

[FIG. 4]
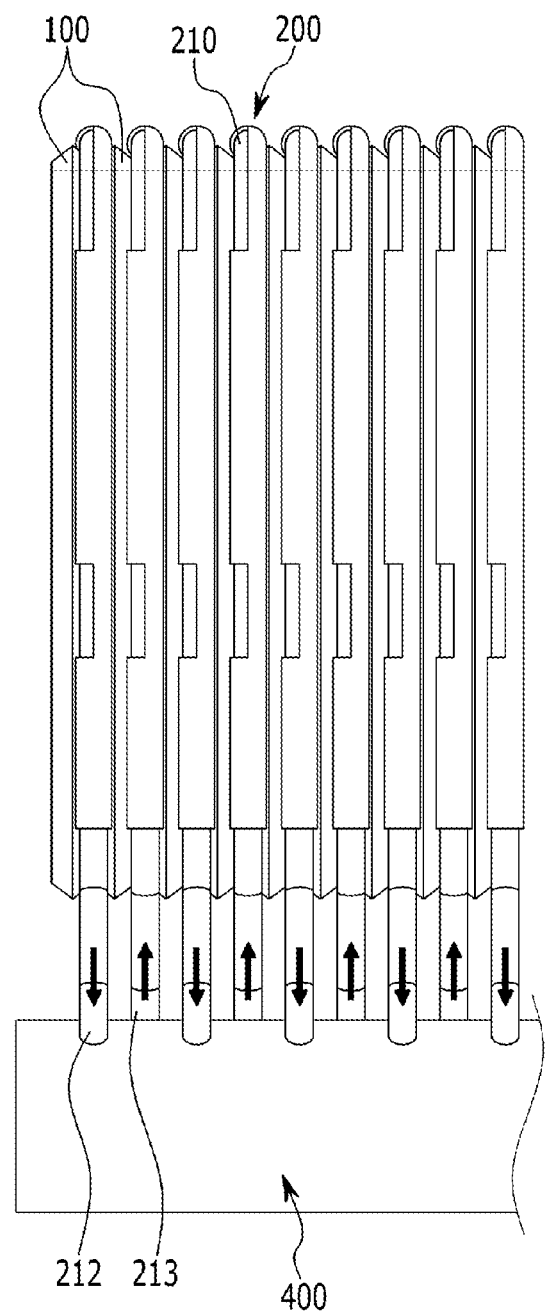

[FIG. 5]
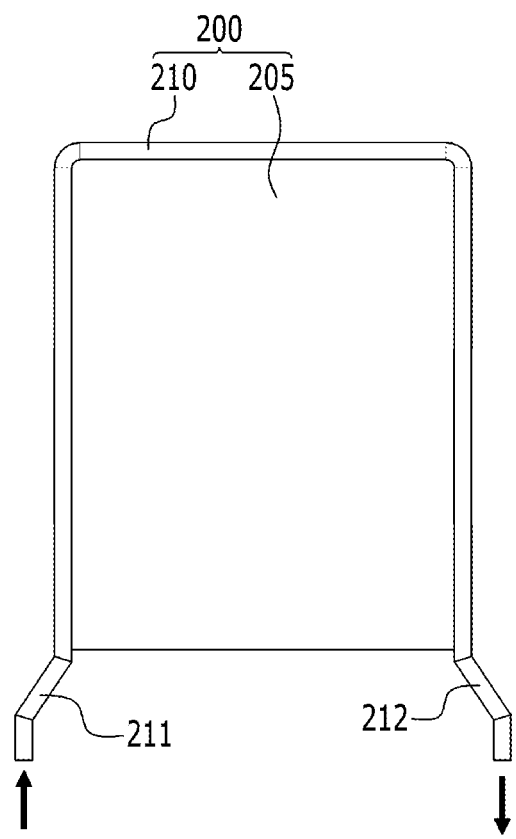

[FIG. 6]
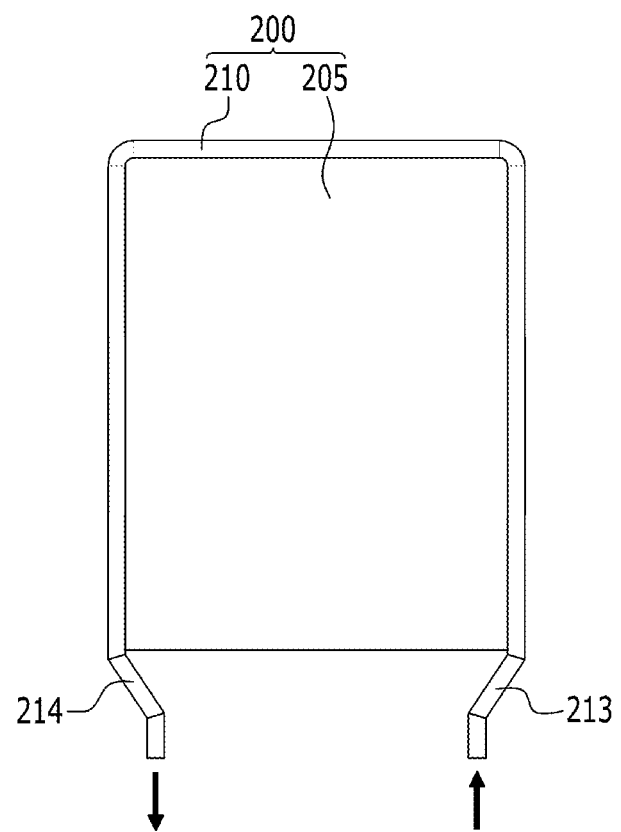

[FIG. 7]
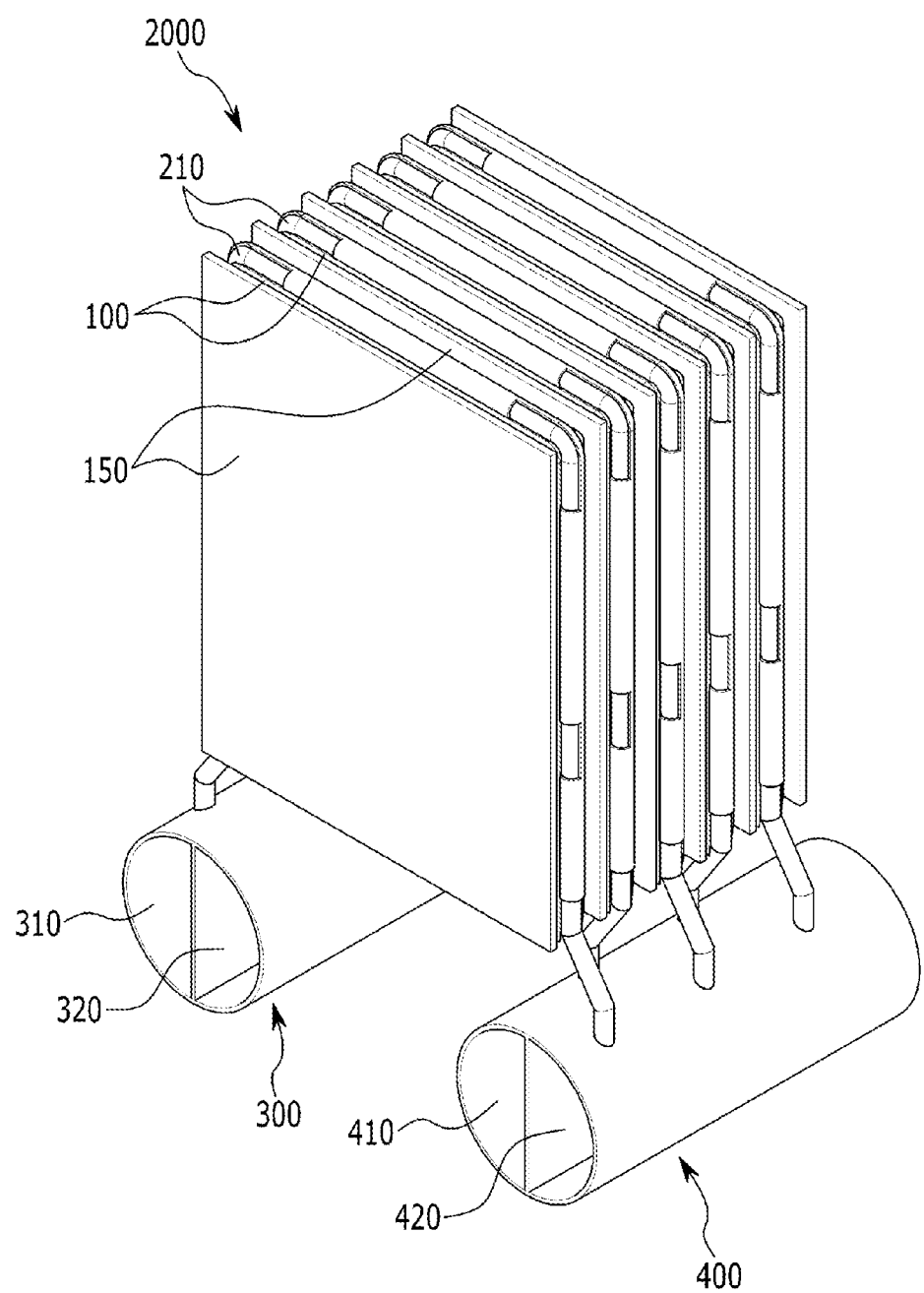

[FIG. 8]
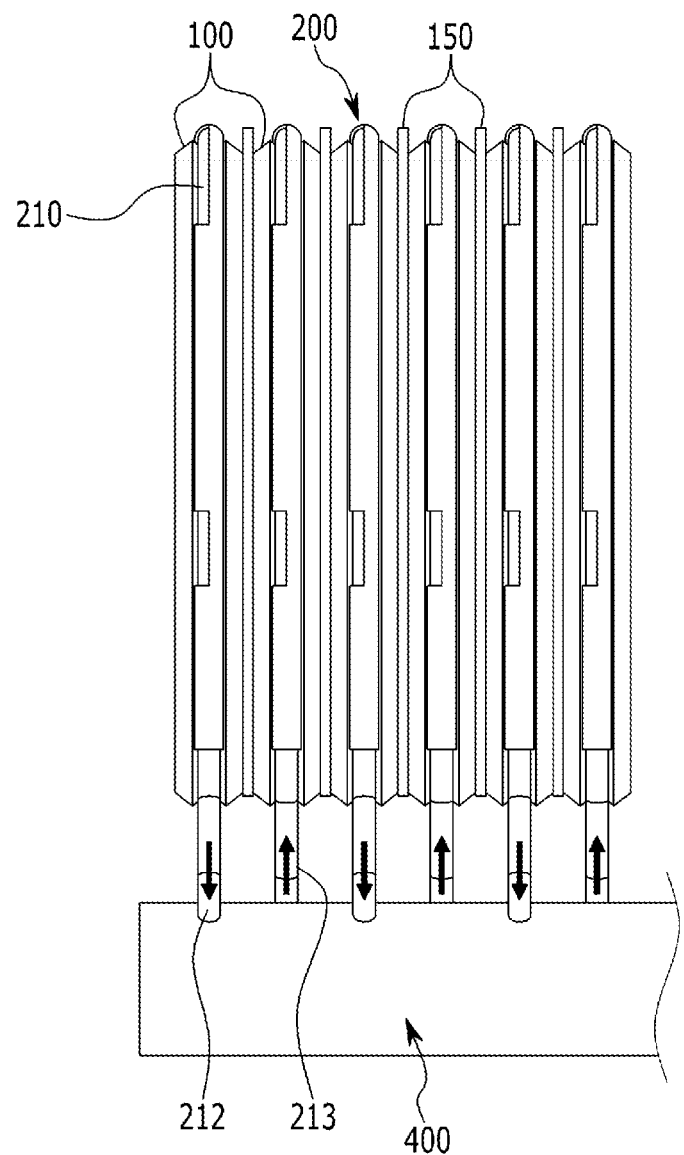

[FIG. 9]
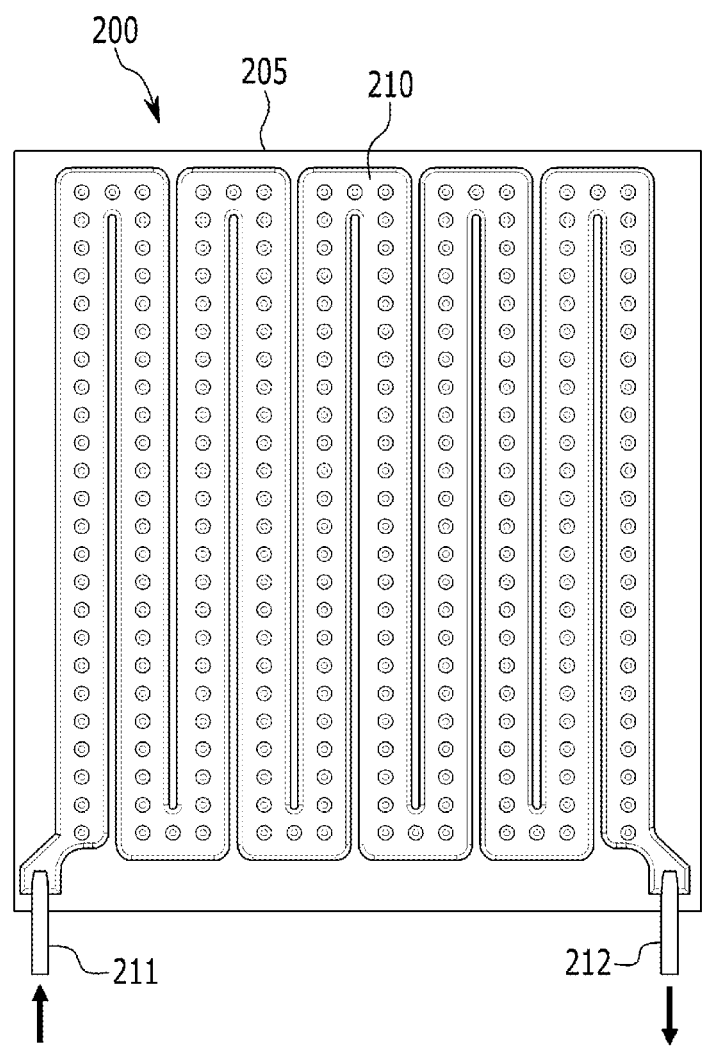

[FIG. 10]
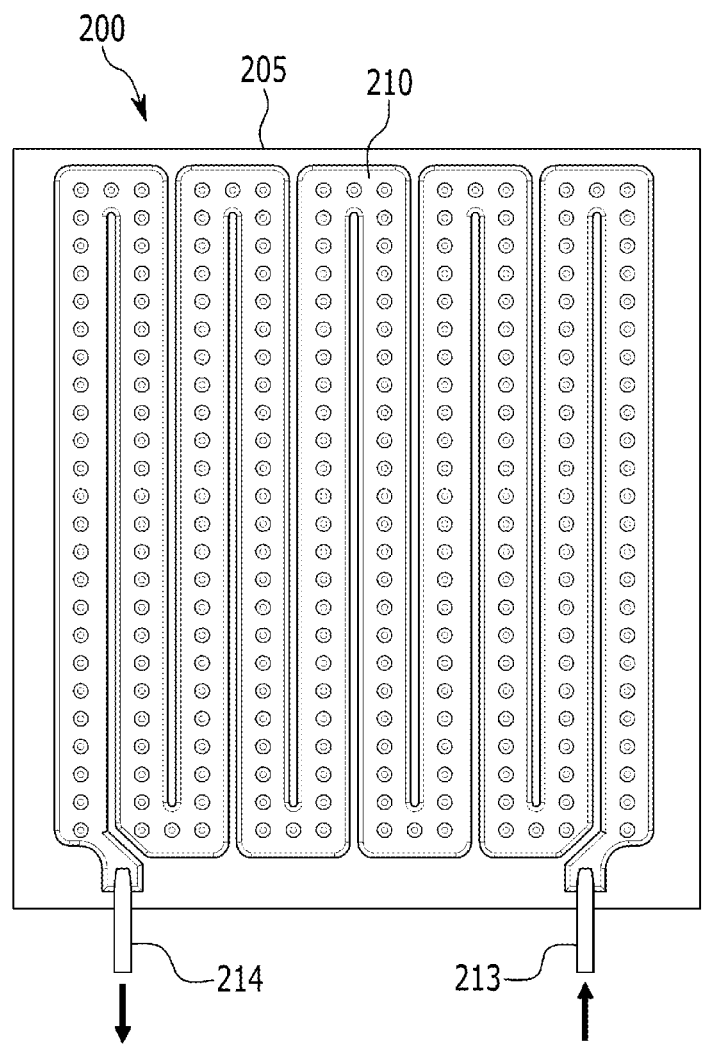

BATTERY MODULE

CROSS-REFERENCE TO RELATED APPLICATIONS

The present application is a national phase entry under 35 U.S.C. § 371 of International Application No. PCT/KR2019/010706 filed Aug. 22, 2019, which claims the benefit of priority from Korean Patent Application No. 10-2018-0111656 filed on Sep. 18, 2018, the disclosure of which is incorporated herein by reference in its entirety.

TECHNICAL FIELD

The present disclosure relates to a battery module, and more particularly, to a battery module including a water-cooled battery cooling device that has improved temperature deviation characteristics.

BACKGROUND ART

A secondary battery, which is easily used in connection with various product groups and has electrical characteristics such as high energy density, is universally used not only for a portable devices but also for electric vehicles (EV) or a hybrid electric vehicles (HEV), energy storage systems or the like, which are driven by an electric driving source. The secondary battery is attracting attention as a new environmentally-friendly energy source for improving energy efficiency since it provides a primary advantage of reducing the use of fossil fuels and also does not generate any by-products by the use of energy.

A battery pack applied to the electric vehicle or the like has a structure in which a plurality of cell assemblies, each including a plurality of unit cells, are connected in series to obtain a high output. In addition, the unit cell may be repeatedly charged and discharged by means of electrochemical reactions among components, including a positive electrode current collector, a negative electrode current collector, a separator, an active material, an electrolyte and the like.

Meanwhile, as the need for large capacity structures is increasing along with the recent utilization of battery packs as an energy storage source, there has been a growing demand for a battery pack in which a plurality of battery modules, each including a plurality of secondary batteries connected in series and/or in parallel, are integrated.

Since battery packs of multi-module structures are manufactured in a form in which a plurality of secondary batteries are compacted in a tight space, it is important to readily release the heat generated in each secondary battery. As one of various methods of releasing heat generated in a secondary battery, Korean Unexamined Patent Publication No. 10-2013-0062056 discloses a cooling method using a cooling water.

FIG. 1 is a configuration diagram in which a cooling flow channel according to the prior art is disposed.

Referring to FIG. 1, a cooling flow channel 10 for cooling a secondary battery is illustrated. The coolant flowing in the cooling flow channel 10 enters the inlet port 11 and comes out through the outlet port 12. In the cooling flow channel 10 having the above structure, the secondary battery has a problem in that the side closer to the inlet port 11 side is cooled more and the side closer to the outlet port 12 side is cooled less. That is, the farther from the inlet port 11 and the closer to the outlet port 12, the higher the temperature of the cooling water, which lowers the cooling efficiency.

The problem of the prior art as described above causes a temperature deviation of the secondary battery. The temperature deviation of the secondary battery leads to a performance deviation of the secondary battery, which eventually leads to poor performance of a system such as a battery pack including a secondary battery. Therefore, a cooling flow channel capable of producing a uniform cooling effect needs to be designed.

DETAILED DESCRIPTION OF THE INVENTION

Technical Problem

It is an object of the present disclosure to provide a battery module demonstrating a uniform cooling performance.

However, the problem to be solved by the embodiments of the present disclosure is not limited to the above-described problem, and it can be variously expanded within the scope of the technical idea included in the present disclosure.

Technical Solution

A battery module according to an embodiment of the present disclosure includes a battery cell laminate including a plurality of battery cells stacked in one direction, cooling fins interposed between the battery cells, and a first cooling manifold and a second manifold connected to the cooling fins, wherein the cooling fins include a first cooling fin having a first inlet port and a first outlet port and a second cooling fin having a second inlet port and a second outlet port, and wherein the first inlet port and the second outlet port are connected to the first cooling manifold, and the second inlet port and the first outlet port are connected to the second cooling manifold.

Each of the first cooling manifold and the second cooling manifold may be divided into two sections.

The two sections are formed of an inlet manifold and an outlet manifold, the first inlet port may be connected to the inlet manifold of the first cooling manifold, the first outlet port may be connected to the outlet manifold of the second cooling manifold, the second inlet port may be connected to the inlet manifold of the second cooling manifold, and the second outlet port may be connected to the outlet manifold of the first cooling manifold.

Each of the first inlet port, the first outlet port, the second inlet port, and the second outlet port may have a bent part.

Each of the first cooling manifold and the second cooling manifold may extend along a stacking direction of the battery cell laminate.

The cooling fins may include a heat dissipation plate and a coolant pipe formed at an edge of the heat dissipation plate.

The first inlet port and the first outlet port may be located at both ends of the coolant pipe, respectively.

The cooling fins may include a heat dissipation plate and a coolant pipe formed inside the heat dissipation plate.

The coolant pipe may have a zigzag structure while overlapping a surface of the battery cell facing the stacking direction of the battery cell laminate.

The battery module may further include a buffering member interposed between the battery cells.

A battery module according to another embodiment of the present disclosure includes a battery cell laminate including a plurality of battery cells stacked in one direction, cooling fins interposed between the battery cells, and a first cooling manifold and a second cooling manifold connected to the cooling fins, wherein the first cooling manifold and the second cooling manifold are connected to the inlet port and the outlet port, respectively, and wherein the inlet port and the outlet port are alternately arranged in each of the first cooling manifold and the second cooling manifold.

Each of the first cooling manifold and the second cooling manifold is divided into two sections, and the inlet port and the outlet port connected to the first cooling manifold may be connected to mutually different sections among the two sections, and the inlet port and the outlet port connected to the second cooling manifold may be connected to mutually different sections among the two sections.

Each of the inlet port and the outlet port may have a bent part.

The direction in which the inlet port is bent and the direction in which the outlet port is bent may be mutually different.

Advantageous Effects

According to the embodiments, a battery module in which the inlet port and the outlet port of the cooling fins are alternately arranged to result in uniform cooling performance can be implemented.

BRIEF DESCRIPTION OF THE DRAWINGS

FIG. 1 is a configuration diagram in which a cooling flow channel according to the prior art is disposed.

FIG. 2 is a perspective view illustrating a battery module according to an embodiment of the present disclosure.

FIG. 3 is a perspective view illustrating a connection relationship between a cooling manifold and a cooling pipe in the embodiment of FIG. 2.

FIG. 4 is a side view of the battery module according to the embodiment of FIG. 2 viewed from one side thereof.

FIG. 5 is a front view illustrating one heat dissipation plate included in the battery module according to the embodiment of FIG. 2.

FIG. 6 is a front view illustrating another heat dissipation plate neighboring the heat dissipation plate described in FIG. 5.

FIG. 7 is a perspective view illustrating a battery module to which a buffering member is added to the embodiment of FIG. 2.

FIG. 8 is a side view of the battery module according to the embodiment of FIG. 7 seen from one side thereof.

FIG. 9 is a front view illustrating a modification of the cooling fin illustrated in FIG. 5.

FIG. 10 is a front view illustrating a modification of the cooling fin illustrated in FIG. 6.

DETAILED DESCRIPTION OF THE EMBODIMENTS

Hereinafter, various embodiments of the present disclosure will be described in detail with reference to the accompanying drawings so that those skilled in the art may easily implement the present disclosure. The present disclosure may be modified in various different ways, and is not limited to the embodiments described herein.

In addition, throughout the specification, when a part is said to "include" a certain component, it means that it can further include other components, without excluding the other components unless otherwise stated.

In addition, throughout the specification, when referred to as "planar", it refers to when a target portion is viewed from above, and when referred to as "cross-section", it refers to when a target portion is viewed from the side of a cross section cut vertically.

FIG. 2 is a perspective view illustrating a battery module according to an embodiment of the present disclosure. FIG. 3 is a perspective view illustrating a connection relationship between a cooling manifold and a cooling pipe in the embodiment of FIG. 2. FIG. 4 is a side view of the battery module according to the embodiment of FIG. 2 viewed from one side thereof. FIG. 5 is a front view illustrating one heat dissipation plate included in the battery module according to the embodiment of FIG. 2. FIG. 6 is a front view illustrating another heat dissipation plate neighboring the heat dissipation plate described in FIG. 5.

Referring to FIGS. 2 to 4, a battery module 1000 according to an embodiment of the present disclosure includes a plurality of battery cells 100 that are positioned side by side at a predetermined interval and cooling fins 200 each interposed between neighboring battery cells 100 and disposed closely to the battery cells 100. The cooling fin 200 includes a plate-shaped heat dissipation plate 205 and a coolant pipe 210 formed at an edge of the heat dissipation plate 205, as shown in FIG. 5 and described later. The coolant pipe 210 may be hook-coupled with the heat dissipation plate 205, or the coolant pipe 210 and the heat dissipation plate 205 may be integrally formed. The coolant pipe 210 is formed so as to be disposed outside the battery cell 100.

Although not shown, the battery cells 100 have electrode tabs formed on one side or both sides of the electrode body, which is formed in a plate shape, and the electrode tabs of the battery cells 100 may be electrically connected to the electrode tabs of the neighboring battery cells 100 in series or in parallel.

Referring to FIGS. 5 and 6, the heat dissipation plate 205 included in the cooling fins 200 is formed in a plate shape, and the heat dissipation plate 205 is interposed between the battery cells 100, so as to be disposed closely to the battery cells 100. Therefore, the heat generated during the charge process or the discharge process of the battery cells 100 can be quickly transferred to the heat dissipation plate 205. Furthermore, the heat dissipation plate 205 may be made of a material having high thermal conductivity such as aluminum or copper, and without limiting the material thereto, if a material can quickly transfer heat generated from the battery cell 100, it can be used to form the heat dissipation plate 205. Herein, the heat dissipation plate 205 may be formed wider than the electrode body of the battery cell 100.

The battery module 1000 according to the present exemplary embodiment includes a first cooling manifold 300 and a second cooling manifold 400 connected to the cooling fins 200. Referring to FIGS. 2 and 3, each of the first cooling manifold 300 and the second cooling manifold 400 extends along a stacking direction of the battery cell laminate including a plurality of stacked battery cells 100. The first cooling manifold 300 and the second cooling manifold 400 are positioned near each other on one end of the battery cell stack, and the first cooling manifold 300 and the second cooling manifold 400 are parallel to each other. In addition, each of the first cooling manifold 300 and the second cooling manifold 400 is divided into two sections.

Specifically, the first cooling manifold 300 may be configured to form two sections, i.e., an inlet manifold 310 and an outlet manifold 320, and the second cooling manifold 400 also may form an inlet manifold 410 and an outlet manifold 420. The inlet manifolds 310 and 410 provide a path for cooling the heat generated in the battery cell 100 by supplying a coolant to the cooling fins 200 through the inlet ports 211 and 213 from the outside. On the other hand, the outlet manifolds 320 and 420 provide a path for recovering the coolant, having played the role of cooling the heat generated from the battery cell 100, from the cooling fins 200 through the outlet ports 212 and 214.

Inlet ports 211 and 213 and outlet ports 212 and 214 are respectively formed at both ends of the coolant pipe 210, so that the coolant passes through the coolant pipe 210 to cause heat exchange. In the present embodiment, although the inlet ports 211 and 213 and the outlet ports 212 and 214 are formed on one side of the heat dissipation plate 205, it can be modified in various ways depending on the shape of the battery cell 100 and the positions of the electrode tabs.

When the battery cell 100 is charged or discharged, heat generated in the electrode body of the battery cell 100 is transferred to the coolant pipe 210 through the heat dissipation plate 205, and is transferred to the coolant passing through the inside of the coolant pipe 210 such that the battery cell 100 is cooled.

The first cooling fin and the second cooling fin selected from a plurality of cooling fins 200 may be neighboring cooling fins. The first cooling fin may have a first inlet port 211 and a first outlet port 212, and the second cooling fin may have a second inlet port 213 and a second outlet port 214. In this embodiment, the first inlet port 211 and the first outlet port 212 are respectively located at both ends of the coolant pipe 210 included in the first cooling fin, and the second inlet port 213 and the second outlet port 214 are respectively located at both ends of the coolant pipe 210 included in the second cooling fin.

The first inlet port 211 and the second outlet port 214 are connected to the first cooling manifold 300, and the second inlet port 213 and the first outlet port 212 are connected to the second cooling manifold 400. Specifically, the first inlet port 211 is connected to the inlet manifold 310 of the first cooling manifold 300, the first outlet port 212 is the outlet manifold 420 of the second cooling manifold 400, the second inlet port 213 is connected to the inlet manifold 410 of the second cooling manifold 400, and the second outlet port 214 is connected to the outlet manifold 320 of the first cooling manifold 300.

According to the present embodiment, in the first cooling manifold 300, the first inlet port 211 and the second outlet port 214 are alternately arranged, and in the second cooling manifold 400, the first outlet port 212 and the second outlet port 213 are alternately arranged.

Thereby, based on the battery cell 100 positioned between the first cooling fin and the second cooling fin, one side of the battery cell 100 is cooled more on the left side, and the opposite side is cooled more on the right side.

Thus, when looking at one battery cell 100, a uniform cooling performance can be seen. Expanding on the present embodiment, by designing each of the first cooling manifold 300 and the second cooling manifold 400 to be connected to the inlet ports 211 and 213 and the outlet ports 212 and 214, and by designing the inlet ports 211 and 213 and the outlet ports 212 and 214 to be alternately arranged along each of the first cooling manifold 300 and the second cooling manifold 400, an overall uniform cooling performance can be achieved in the battery cell laminate.

In FIGS. 2 and 4, a cooling fin 200 is formed for each of the battery cells 100, but in another example of the battery module 1000, each the cooling fins 200 may be interposed in close disposition between a pair of battery cells 100. The number of cooling fins 200 may vary depending on the battery capacity of the secondary battery, without being limited to such a structure.

Each of the first inlet port 211, the first outlet port 212, the second inlet port 213, and the second outlet port 214 may have a bent part. In this case, the directions in which the first inlet port 211 and the second inlet port 213 are bent are the same, and the directions in which the first outlet port 212 and the second outlet port 214 are bent are the same. However, the directions in which the inlet ports 211 and 213 and the outlet ports 212 and 214 are bent are different.

Thus, by having a bent part in the connecting member between the cooling fins 200 and the cooling manifolds 300 and 400 according to the present embodiment, the first inlet port 211, the first outlet port 212, the second inlet port 213 and the second outlet port 214 can be stably connected to the inlet manifold 310 and outlet manifold 420 of each of the first cooling manifold 300 and the second cooling manifold 400, such that the connection relationship described above can be implemented.

FIG. 7 is a perspective view illustrating a battery module to which a buffering member is added to the embodiment of FIG. 2. FIG. 8 is a side view of the battery module according to the embodiment of FIG. 7 seen from one side thereof.

Referring to FIGS. 7 and 8, all components are identical to those of the exemplary embodiment described with reference to FIGS. 2 to 6, but the battery module 2000 according to the present embodiment further includes a buffering member 150 formed between neighboring battery cells 100. The buffering member 150 may play a role of alleviating an impact due to a volume change when the battery cells 100 swell while driving the secondary battery.

FIG. 9 is a front view illustrating a modification of the cooling fin illustrated in FIG. 5. FIG. 10 is a front view illustrating a modification of the cooling fin illustrated in FIG. 6.

Referring to FIGS. 9 and 10, there is a difference in the structure of the cooling fin 200 of the embodiment illustrated in FIGS. 5 and 6. The cooling fin 200 according to the present embodiment includes a heat dissipation plate 205 and a coolant pipe 210 formed inside the heat dissipation plate 205.

The coolant pipe 210 may have a zigzag structure while overlapping the surface of the adjacent battery cell 100 in the stacking direction of the battery cell laminate. In other words, the coolant pipe 210 may be arranged to substantially overlap the entire surface of the battery cell while having a zigzag structure to cool the battery cell 100. In this case, inlet ports 211 and 213 and outlet ports 212 and 214 are respectively formed at both ends of the coolant pipe 210, so that the coolant may pass through the coolant pipe 210 to cause heat exchange.

Although the preferred embodiments of the present disclosure have been described in detail above, the scope of the present disclosure is not limited thereto, and various modifications and improvements by those skilled in the art using the basic concepts of the present disclosure defined in the following claims also belong to the scope of rights.

EXPLANATION OF SYMBOLS

10: cooling flow channel
200: cooling fin
205: heat dissipation plate
210: coolant pipe 211, 213: inlet port
212, 214: outlet port
300, 400: cooling manifold

The invention claimed is:

1. A battery module comprising:
   a battery cell laminate comprising a plurality of battery cells stacked along a stacking direction,
   a plurality of cooling fins interposed between the battery cells, and
   a first cooling manifold and a second cooling manifold connected to the cooling fins,
   wherein the cooling fins include a first cooling fin and a second cooling fin, the first cooling fin having a first inlet port and a first outlet port, and the second cooling fin having a second inlet port and a second outlet port,
   wherein the first inlet port and the second outlet port are connected to the first cooling manifold, and the second inlet port and the first outlet port are connected to the second cooling manifold, and
   wherein each of the plurality of cooling fins comprises a heat dissipation plate and a coolant pipe, the coolant pipe being positioned along an edge of the heat dissipation plate, so as to encircle a portion of a perimeter of the heat dissipation plate, wherein the perimeter is disposed at an outermost edge of the heat dissipation plate, such that no portion of the heat dissipation plate extends outwardly beyond the cooling pine.

2. The battery module of claim 1,
   wherein each of the first cooling manifold and the second cooling manifold is divided into two sections.

3. The battery module of claim 2,
   wherein the two sections comprise an inlet manifold and an outlet manifold, the first inlet port being connected to the inlet manifold of the first cooling manifold, the first outlet port being connected to the outlet manifold of the second cooling manifold, the second inlet port being connected to the inlet manifold of the second cooling manifold, and the second outlet port being connected to the outlet manifold of the first cooling manifold.

4. The battery module of claim 3,
   wherein each of the first inlet port, the first outlet port, the second inlet port, and the second outlet port has a bent part.

5. The battery module of claim 1,
   wherein each of the first cooling manifold and the second cooling manifold extends along the stacking direction of the battery cell laminate.

6. The battery module of claim 1,
   wherein the first inlet port and the first outlet port are located at respective opposing ends of the coolant pipe.

7. The battery module of claim 1,
   wherein each of the plurality of cooling fins comprises a heat dissipation plate and a coolant pipe, the coolant pipe positioned inside of the heat dissipation plate.

8. The battery module of claim 7,
   wherein the coolant pipe has a zigzag structure that overlaps a surface of one of the battery cells adjacent to the respective cooling fin in the stacking direction of the battery cell laminate.

9. The battery module of claim 1,
   further comprising a buffering member interposed between the battery cells.

10. A battery module comprising:
    a battery cell laminate comprising a plurality of battery cells stacked along a stacking direction,
    a plurality of cooling fins interposed between the battery cells, each of the cooling fins having an inlet port and an outlet port, and
    a first cooling manifold and a second cooling manifold connected to the cooling fins,
    wherein the first cooling manifold and the second cooling manifold are connected to the inlet port and the outlet port, respectively, of a first one of the plurality of cooling fins, wherein each of the inlet port and the outlet port of the first one of the plurality of cooling fins has a portion extending obliquely relative to an edge of the first one of the plurality of cooling fins, and
    wherein the inlet port of each successive one of the cooling fins along the stacking direction from the first one of the cooling fins is alternately connected to either the second cooling manifold or the first cooling manifold, and wherein the outlet port of each successive one of the cooling fins along the stacking direction from the first one of the cooling fins is alternately connected to either the first cooling manifold or the second cooling manifold,
    wherein the portion extending obliquely of each of the successive inlet and outlet ports along any one of the first and second cooling manifolds has a respective oblique angle that extends in an opposing direction relative to the portion extending obliquely of a preceding one of adjacent inlet and outlet ports.

11. The battery module of claim 10,
    wherein each of the first cooling manifold and the second cooling manifold is divided into two sections, and the inlet ports connected to the first cooling manifold are connected to a different one of the two sections of the first cooling manifold than are the outlet ports connected to the first cooling manifold, and the inlet ports connected to the second cooling manifold are connected to a different one of the two sections of the second cooling manifold than are the outlet ports connected to the second cooling manifold.

12. The battery module of claim 10,
    wherein the inlet port and the outlet port of each of the cooling fins are bent in a different direction.

13. The battery module of claim 10,
    wherein each of the first cooling manifold and the second cooling manifold extends along a stacking direction of the battery cell laminate.

* * * * *